Sept. 1, 1953     E. R. BERNIGHT     2,650,579
VALVE CONSTRUCTION
Filed Aug. 28, 1951     2 Sheets-Sheet 1
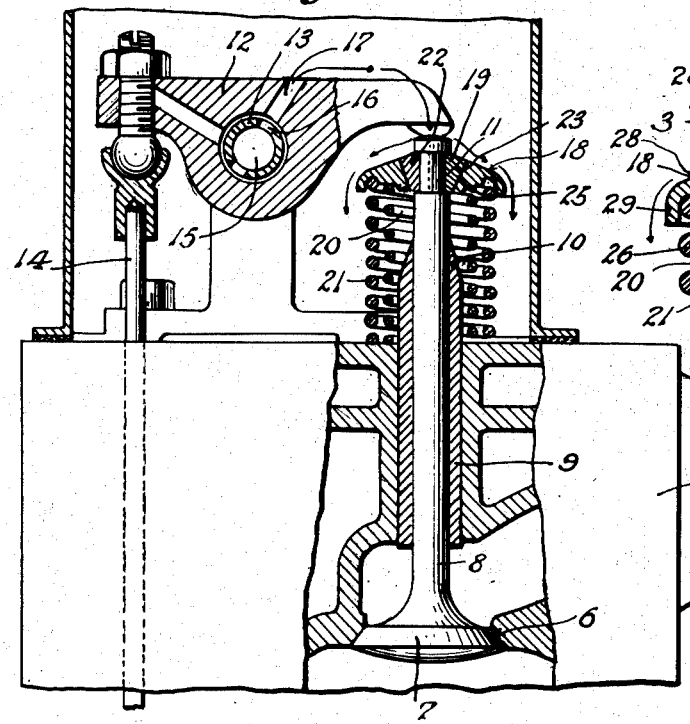
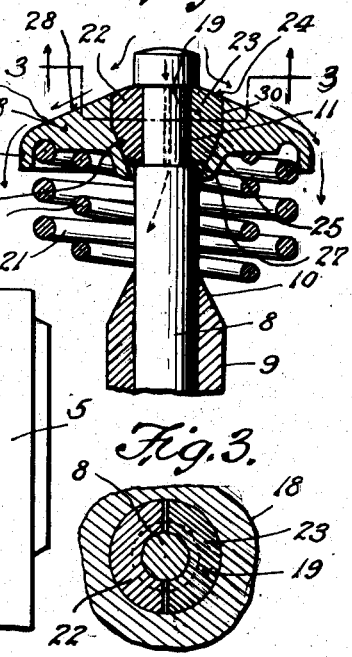
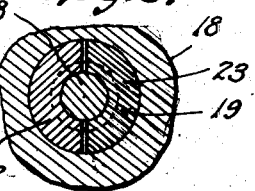
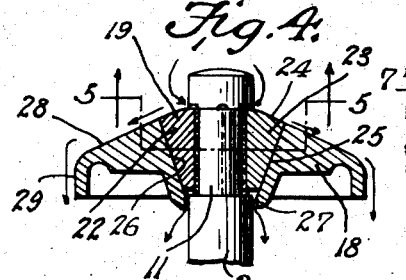
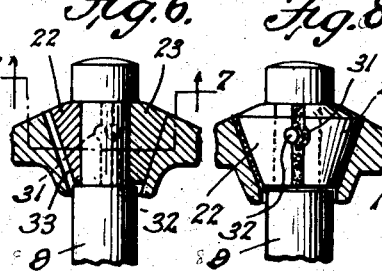
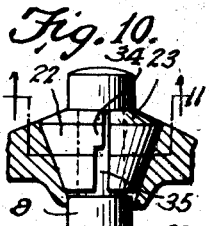
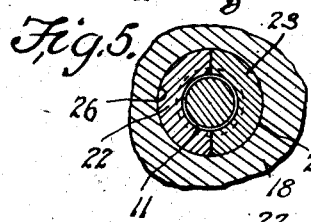
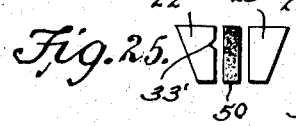
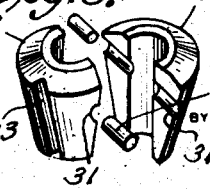
INVENTOR.
Edward R. Bernight
BY Ralph Burch
ATTORNEYS

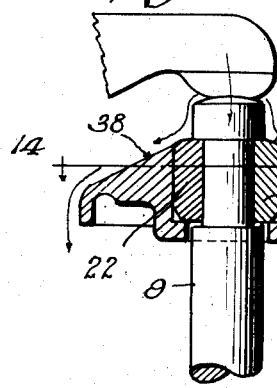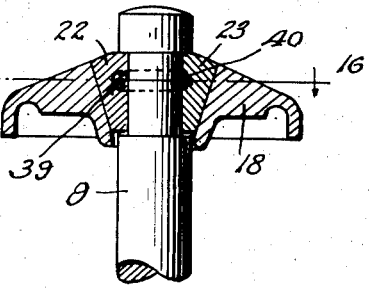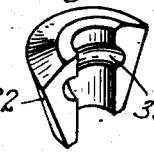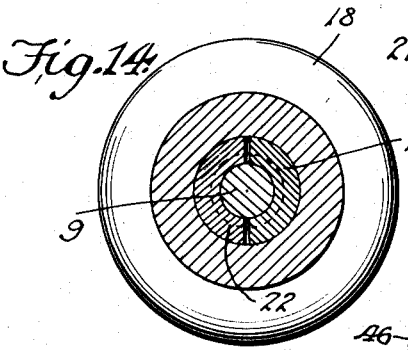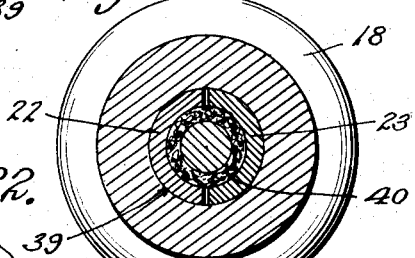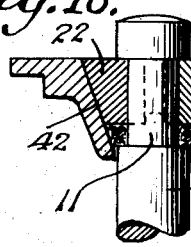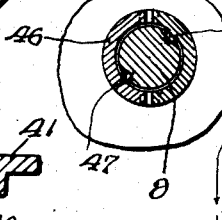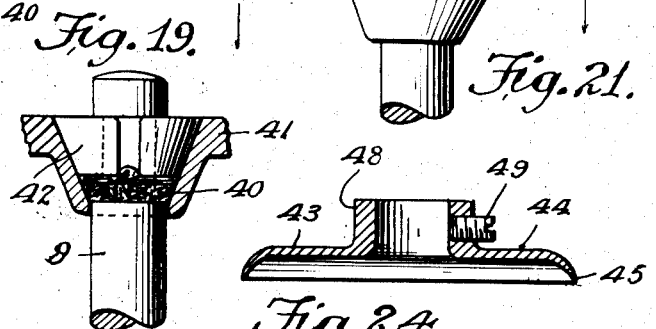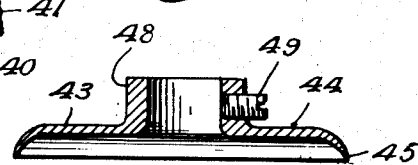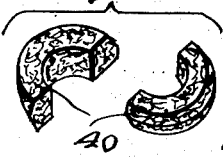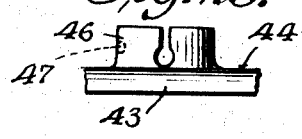

Patented Sept. 1, 1953

2,650,579

UNITED STATES PATENT OFFICE 2,650,579

VALVE CONSTRUCTION

Edward Reed Bernight, Pinellas Park, Fla.

Application August 28, 1951, Serial No. 243,929

4 Claims. (Cl. 123—90)

This invention relates to improvements in the valve construction of overhead valve engines and more particularly the construction of the valve spring retainer, locking member for the same and valve stem guide.

The valve spring retainers now employed in overhead valve engines are objectionable in that they allow an excess of lubricating oil to flow or run down the valve stem and enter the cylinders. This results in an increased consumption of oil and formation of carbon on the valve stem and in the cylinder.

It is an object of the present invention to provide a spring retainer designed and constructed so that only a limited amount of oil is permitted to run down the valve stem and the excess oil is carried away from the valve stem.

A further object of the invention is to provide a spring retainer having a locking member for securing the retainer to the valve stem which regulates the flow of oil down the valve stem, the locking member and retainer being designed to direct the excess oil from the stem.

Another object of the invention is to provide a spring retainer which is simple and durable in construction, reliable and efficient in operation and inexpensive to manufacture.

Other objects and advantages of the invention will be apparent during the course of the following description.

In the accompanying drawings forming a part of this specification and in which like numerals are employed to designate like parts throughout the same, Fig. 1 is a fragmentary vertical section of a portion of an engine cylinder head, showing a poppet valve equipped with a valve spring retainer according to this invention, Fig. 2 is an enlarged sectional view of a slightly modified form of locking member applied to the retainer, Fig. 3 is a section taken on line 3—3 of Fig. 2, Fig. 4 is an enlarged view of the retainer shown in Fig. 1 with the valve springs removed, Fig. 5 is a section taken on line 5—5 of Fig. 4, Fig. 6 is a sectional view of a modified form of locking member for the retainer, Fig. 7 is a section taken on line 7—7 of Fig. 6, Fig. 8 is a side elevational view of the locking member shown in Fig. 6, Fig. 9 is a perspective view with the parts in separate relation of the locking member shown in Fig. 8, Fig. 10 is a side elevational view of another form of locking member, Fig. 11 is a section taken on line 11—11 of Fig. 10, Fig. 12 is a perspective view of one segment of the locking member shown in Fig. 10, Fig. 13 is a sectional view of another modified form of locking member and retainer, Fig. 14 is a section taken on line 14—14 of Fig. 13, Fig. 15 is a sectional view of another modified form of locking member, Fig. 16 is a section taken on line 16—16 of Fig. 15, Fig. 17 is a perspective view of one half of the locking member shown in Fig. 15, Fig. 18 is a sectional view of another modified form of locking member, Fig. 19 is a side elevational view of the form of locking member shown in Fig. 18, Fig. 20 is a perspective view of the sealing gasket used with the locking member in Fig. 18, Fig. 21 is a sectional view of a shield for use with a conventional spring retainer, Fig. 22 is a section taken on line 22—22 of Fig. 21, Fig. 23 is a fragmentary side elevational view of the clamping collar of the shield shown in Fig. 21, and, Fig. 24 is a sectional view of a modified form of shield.

Fig. 25 is a side elevational view of a conventional locking member showing a packing member for sealing the joint between the segments of the locking member.

In the drawings wherein for the purpose of illustration I have been shown the preferred embodiment of my invention and various modifications of the same, the numeral 5 represents a portion of the cylinder head of an internal combustion engine having a port 6 normally closed by a conventional poppet valve 7 having a stem 8 slidably mounted in a guide 9 extending vertically through the cylinder head. The guide 9 extends above the top surface of the cylinder head and has its upper end beveled, as at 10, for diverting the oil flowing down the stem away from the stem. The stem 8 extends above the upper end of the guide 9 and adjacent its upper end is provided with an annular recess 11. The valve is actuated by a conventional rocker arm 12 mounted upon a valve rocker shaft 13 having one end engaged with the upper end of the valve stem 8 and its opposite end in engagement with the usual push rod 14. The rocker arm and associated parts are of usual construction and operate at predetermined intervals to depress the valve stem to open the valve 7. The rocker shaft 13 has a bore 15 for conducting lubricant to the rocker arms, the oil being delivered to the top of the rocker arm through a port 16 and passage 17 so that it flows down onto the top of the valve stem.

Referring more particularly to my invention a valve spring retainer 18 is secured on the upper end of the valve stem 8 by a locking member 19 seated in the recess 11. Mounted between the retainer 18 and top of the cylinder head are the usual inner and outer coil springs 20 and 21 which act to yieldably hold the valve seated. The locking member 19 consists of a split bushing forming complementary segments 22 and 23 adapted to fit within the recess 11 and embrace the valve stem with their meeting edges spaced apart to provide a clearance of two thousandths of an inch, more or less. The spacing of the segments 22 and 23 determines the amount of oil allowed to flow down the valve stem and in order that the excess oil will flow away from the stem the upper edge of each segment is beveled downwardly and outwardly, as at 24. The outer sides of the segments are tapered downwardly and inwardly from the beveled edges 24, as at 25, adapted to fit in the tapered socket 26 formed in the center of the retainer 18. The socket 26 extends downwardly, as at 27, below the lower wall of the recess 11 and directs the flow of oil passing through the bushing onto the valve stem. The top surface of the retainer 18 is inclined downwardly and outwardly, as at 28, and is contiguous with the beveled edges 24 of the bushing. The marginal edge of the retainer 18 is turned downwardly forming a depending lip 29 which directs the flow of oil outwardly from the retainer and away from the valve springs.

Variations in the design and construction of the locking member may be made without departing from the spirit of the invention. In Fig. 2 the locking member is shown provided with a vertical side wall 30 between the bevel edges 24 and tapered sides 25 and the socket of the retainer 18 is provided with correspondingly shaped vertical walls to establish a close fit with the wall 30 of the locking member when the parts are assembled.

In Figs. 6, 7, 8 and 9, the meeting edges of the segments 22 and 23 are provided with transverse grooves 31 in opposed relation to receive rolls of yieldable packing 32 which upon compressing of the segments together seals the joint between the segments. With this form of locking member one of the segments is provided in its outer wall with a longitudinal slot 33 for metering the oil passing to the valve stem.

In Figs. 10, 11 and 12 the segments 22 and 23 of the locking member have a boss 34 formed integral with one of the meeting edges of each segment at the upper end therof for abutting engagement with the meeting edge of the other segment whereby the lower portions of the meeting edges are spaced apart, as at 35, when the segments are assembled.

In the form shown in Fig. 13, the retainer is provided with a straight vertical socket 36 having an inturned flange 37 at its lower end. The segments of the locking member are provided with vertical outer walls to fit the socket 36 of the retainer and the top edges of the segments are beveled as at 37, to merge with the tapered top surface 38 of the retainer.

In Figs. 15, 16 and 17 the segments 22 and 23 are provided on their inner wall with an annular groove 39 to receive a split annular packing ring 40 more clearly shown in Fig. 20. Figs. 18 and 19 show the split packing ring 40 mounted in the lower end of the recess 11 beneath the lower end of the locking member. This form of the invention is designed for use with a conventional spring retainer 41 which has a flat top surface and a conventional locking member 42 also having a flat top edge. The opposed edges of the segments of the locking member are spaced apart and when the packing ring 40 is compressed it enters the space between the opposed edges of the segments sealing the slots.

In Figs. 21, 22, 23 and 24, a shield 43 is provided for mounting over the top of a conventional spring retainer having a flat horizontal surface 44 with its marginal edges extending beyond the edges of the retainer and turned downwardly to form a lip 45. An upstanding split collar 46 is formed in the center of the shield adapted to fit over the upper end of the valve stem. Indentations 47 in the walls of the collar engage in a groove in the stem, as shown in Fig. 22. If desired the shield may be provided with a collar 48 having a set screw 49 for securing the shield on the stem, as shown in Fig. 24.

In use, it will be found my improved locking member and spring retainer effectively controls the flow of oil to the valve stem and thereby prevents oil from flowing down the stem into the cylinders of the engine. Both the locking member and spring retainer are designed to divert the excess flow of oil from the stem which reduces the consumption of oil and eliminates the formation of carbon in the cylinders. The locking member and retainer are inexpensive to manufacture and may be applied to the conventional valve stem without alterations making it practical for use with engines of present construction.

In Fig. 25 a conventional type of locking member is shown composed of segments 22 and 23 and disposed between the meeting edges of the segments is a packing strip 50 which seals the joint between the segments when compressed. A notch 33' formed in the edge of one segment holds the packing strip against displacement.

It is to be understood that the forms of my invention herein shown and described are to be considered as preferred embodiments of the same and changes in the shape, size and arrangement of the parts may be made without departing from the spirit of the invention.

Having thus described my invention, I claim:

1. In a valve assembly for internal combustion engines including a poppet valve having a stem provided with an annular recess adjacent its upper end, a valve spring retainer having a downwardly inclined upper surface and a central tapered socket through which said stem extends, a split bushing embracing said stem and seated in the recess thereof, said bushing having its outer wall tapered to seat in the socket of said retainer, the upper edge of said bushing being beveled outwardly and downwardly into merging relation with the downwardly inclined upper surface of said retainer, said retainer having its marginal edge bent downwardly to form a depending lip.

2. In a valve assembly for internal combustion engines including a poppet valve having a stem provided with an annular recess adjacent its upper end, a valve spring retainer having a central tapered socket, a locking member composed of cylindrical segments fitted in the socket of said spring retainer and embracing said valve stem within the recess thereof, the outer wall of one segment having a longitudinal groove formed therein, and sealing means between the confronting edges of said segments.

3. In a valve assembly for internal combustion engines including a poppet valve having a stem provided with an annular recess adjacent its upper end, a valve spring retainer having a downwardly inclined upper surface and a central tapered socket through which said stem extends, a longitudinally split bushing embracing said stem and seated in the recess thereof, said bushing having its outer wall tapered to seat in the socket of said retainer, the top surface of said bushing being inclined downwardly from said stem into merging relation to the upper surface of said retainer, the lower marginal edge of said retainer being turned downwardly to form a depending lip.

4. In a valve assembly for internal combustion engines including a poppet valve having a stem provided with an annular recess adjacent its upper end, a valve spring retainer having a downwardly inclined upper surface and a central tapered socket through which the said stem extends, a longitudinally split bushing embracing said stem and seated in the recess thereof, said bushing having its outer wall tapered to seat in the socket of said retainer, with the socket extending below said bushing for contacting engagement with the stem of said valve, the top surface of said bushing extending above said retainer and inclined downwardly from said stem into merging relation to the upper surface of said retainer, the lower marginal edge of said retainer being turned downwardly to form a depending lip.

EDWARD REED BERNIGHT.

References Cited in the file of this patent

UNITED STATES PATENTS

| Number | Name | Date |
|---|---|---|
| 2,191,333 | Willgoos | Feb. 20, 1940 |
| 2,222,792 | Wylie | Nov. 26, 1940 |
| 2,241,498 | Wylie | May 13, 1941 |
| 2,419,708 | Cummings | Apr. 29, 1947 |
| 2,505,128 | MacPherson | Apr. 25, 1950 |

FOREIGN PATENTS

| Number | Country | Date |
|---|---|---|
| 216,493 | Great Britain | July 27, 1925 |